March 24, 1970 — D. J. SQUIERS — 3,502,944
ELECTROTHERMAL INTEGRATOR
Filed Aug. 28, 1967 — 2 Sheets-Sheet 1
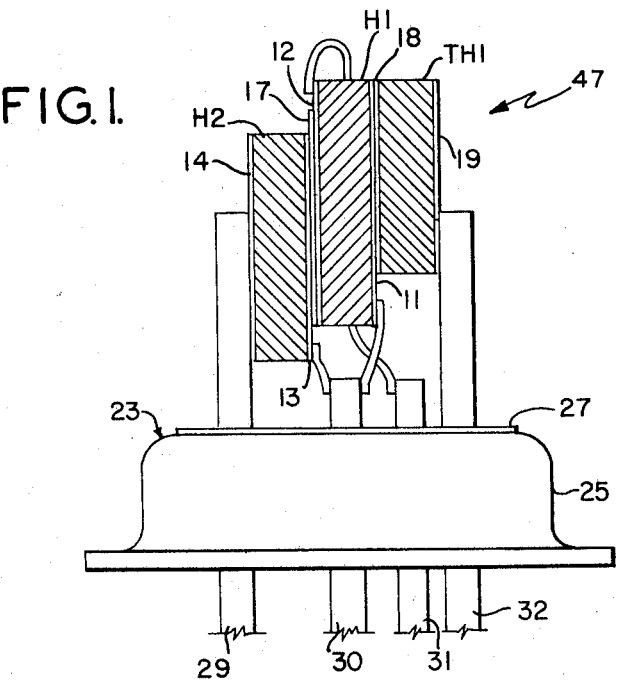
FIG. I.
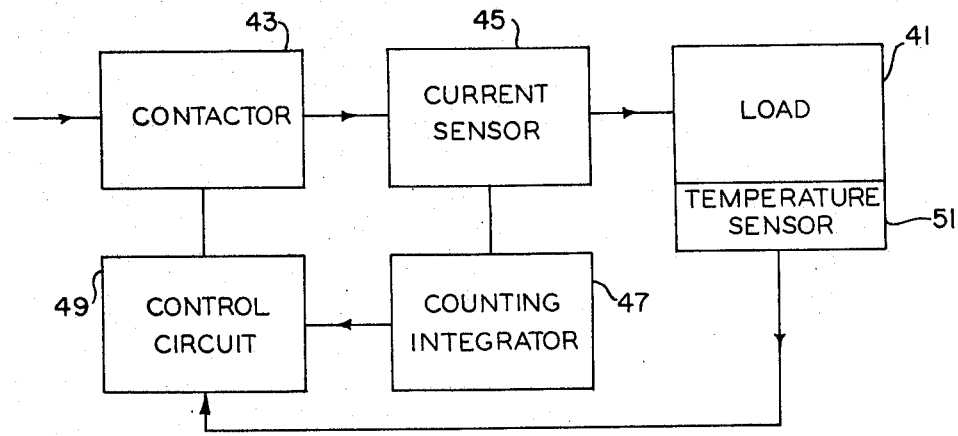
FIG. 2.
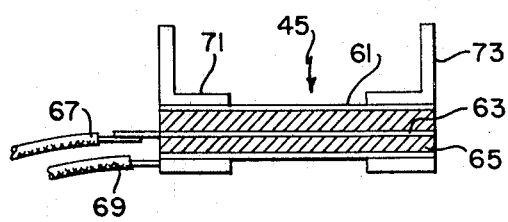
FIG. 3.
David J. Squiers,
Inventor.
Koenig, Senniger,
Powers and Leavitt,
Attorneys.

March 24, 1970  D. J. SQUIERS  3,502,944
ELECTROTHERMAL INTEGRATOR
Filed Aug. 28, 1967  2 Sheets-Sheet 2

United States Patent Office 3,502,944
Patented Mar. 24, 1970

3,502,944
ELECTROTHERMAL INTEGRATOR
David J. Squiers, North Attleboro, Mass., assignor to Texas Instruments Incorporated, Dallas, Tex., a corporation of Delaware
Filed Aug. 28, 1967, Ser. No. 663,708
Int. Cl. H02h 5/04; H01c 7/04
U.S. Cl. 317—13
10 Claims

ABSTRACT OF THE DISCLOSURE

The apparatus disclosed is operative to protect an electrical load from overload conditions. The load current is sensed and a signal which varies as a function thereof is provided. The load is then deenergized whenever the signal exceeds a preselected level for longer than a predetermined interval. Further, the apparatus employs an electrothermal integrator as a counter which responds to the overload signals to reenergize the load a predetermined number of times after it has been deenergized by overloads and then to permanently deenergize the load if the overload conditions persist. The electrothermal integrator includes first and second heaters which are thermally coupled to one another to form a body having a predetermined thermal inertia. The overload signals are applied to a first heater to supply a substantially predetermined amount of heat to said body each time the load is energized. The second heater comprises a mass of semiconductive material the resistance of which varies substantially with temperature. Current is applied to the second heater to provide a regenerative heating thereof when the temperature of the body exceeds a predetermined threshold. Accordingly, the heat generated by the first heater in response to the overload signals is integrated by the thermal inertia of the body until its temperature reaches the threshold of the second heater whereupon regenerative heating of the semi-conductor mass causes the temperature of the body to rise abruptly. A sensing thermistor senses this abrupt rise in temperature and operates a control circuit to permanently deenergize the load.

This invention relates to electrothermal integrators and more particularly to such an integrator which provides an indication when the integrated value of the signal exceeds a predetermined value.

Among the several objects of the present invention may be noted the provision of apparatus which provides a signal or indication when the integrated value of a signal exceeds a predetermined level; the provision of such apparatus which is operable as a counter to provide an indication when a preselected number of signals are applied thereto; the provision of apparatus for protecting an electrical load under overload conditions; the provision of such apparatus which will deenergize the load under overload conditions, reenergize the load a predetermined number of times only, and then deenergize the load without reenergizing it if the overload condition persists; the provision of such apparatus which is reliable; and the provision of such apparatus which is relatively simple and inexpensive. Other objects and features will be in part apparent and in part pointed out hereinafter.

Briefly, apparatus according to this invention is operative to provide an indication when the integrated value of a signal exceeds a predetermined level. The apparatus includes first and second heaters which are thermally coupled to one another thereby forming a body having a substantially predetermined thermal inertia. The first heater is connected in a circuit for generating an amount of heat which varies as a function of the signal. The second heater comprises a mass of semiconductor material the resistance of which varies substantially with temperature. Current is applied to the second heater to provide regenerative heating thereof when the temperature of the mass exceeds a predetermined threshold. Accordingly, heat generated by the first heater is integrated by the thermal inertia of the body until the temperature of the semiconductor mass reaches its threshold temperature whereupon regenerative heating of that mass causes the temperature of the body to rise abruptly thereby indicating that the integrated value of the signal has exceeded said predetermined level.

The invention accordingly comprises the constructions hereinafter described, the scope of the invention being indicated in the following claims.

In the accompanying drawings in which one of various possible embodiments of the invention is illustrated, FIG. 1 is a side view partially in section of an electrothermal integrator of this invention;

FIG. 2 is a block diagram of a system of this invention for protecting an electrical load such as a motor under overload conditions;

FIG. 3 is a side view, partially in section, of a coaxial current sensor employed in the system of FIG. 2.

Corresponding reference characters indicate corresponding parts throughout the several views of the drawings.

Figure 4:
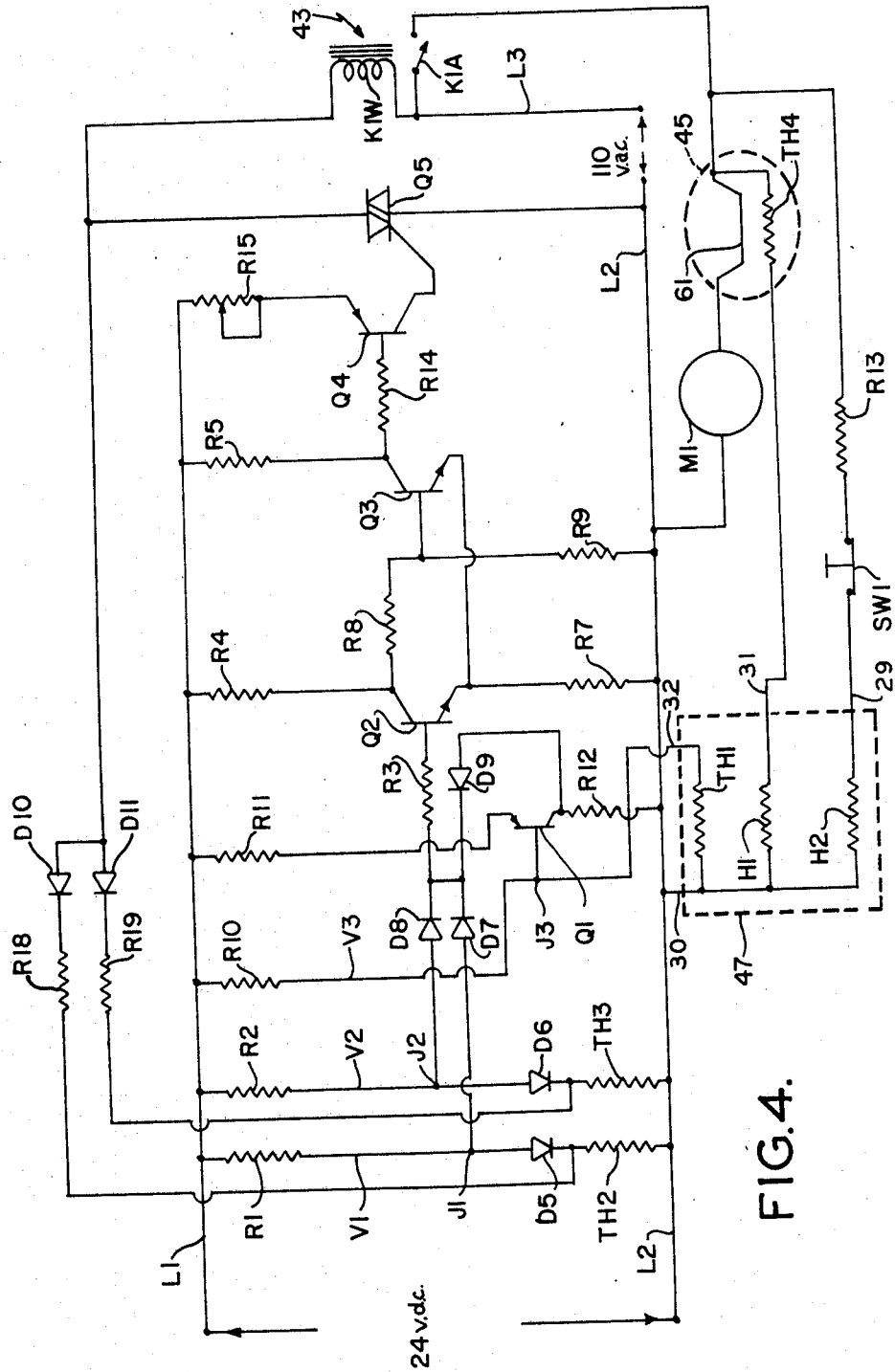
FIG. 4 is a schematic circuit diagram of the system of FIG. 2.

Referring now to FIG. 1, the electrothermal integrator illustrated there comprises two heaters H1 and H2 each of which comprises a small mass of a semiconductor or thermistor material. The material comprising heater H1 is of the PTC (positive temperature coefficient) type and preferably has a resistance characteristic in which the resistance of the material rises relatively abruptly at a relatively high transition temperature, e.g., 120° C. The material of heater H2 is also of the PTC type but has a lower transition temperature, e.g., about 80° C. Suitable electrodes 11–14 are applied on both sides of the masses of semiconductor material comprising the heaters H1 and H2. By means of these electrodes electrical connections may be made to the heaters. Heaters H1 and H2 are cemented to each other in heat exchange relationship with a thin film or layer 17 of an insulating material between them. Heaters H1 and H2 together thus comprise a body having a predetermined thermal inertia. Further, there is a delay before heat generated in one of the heaters can affect the other due to the presence of insulating layer 17.

A sensing thermistor TH1 is cemented to the side of heater H1 which is opposite heater H2. Thermistor TH1 comprises a mass of semiconductor or thermistor material of the NTC type. Suitable electrodes 18 and 19 are applied to the mass of material comprising thermistor TH1 thereby to permit electrical connections to be made thereto. Thermistor TH1 thus comprises a part of the thermal body which includes heaters H1 and H2. The resistance of thermistor TH1 varies in response to the temperature of the body generally and more particularly to the temperature of the heater H1 to which it is closely coupled.

The thermal body comprising heaters H1 and H2 and the thermistor TH1 is mounted on a header 23 of the type typically employed in packaging transistors or integrated circuits. Header 23 includes a base ring 25, a button 27 of insulating material and a plurality of leads 29–32 which extend through button 27 so as to be insulated from each other and from ring 25. The electrodes of heaters H1 and H2 and thermistor TH1 are connected to these leads so that these elements may be interconnected in the control circuitry described in greater detail hereinafter with reference to FIG. 4.

The operation of the integrator is substantially as follows, it being assumed that the thermal body is initially at a relatively cool ambient temperature, that is, well below the transition temperatures of both the heaters H1 and H2. When a signal is applied to heater H1, it generates a corresponding amount of heat by resistive heating. This heat is transmitted essentially immediately to thermistor TH1 since this thermistor is directly in contact with H1. Thus the resistance of thermistor TH1 will reflect the heat generated by heater H1 relatively quickly after the application of a signal thereto. The heat generated by heater H1 also tends to increase the temperature of the thermal body generally. The rate of dissipation of heat from the body is relatively slow as compared with the rate at which heat can be generated by heater H1 and, accordingly, the thermal body tends to accumulate or integrate heat as a signal is applied to heater H1 and the temperature of the body rises in a predictable fashion. The signal which is applied to heater H1 may be either a continuous or modulated signal or it may comprise a succession of pulses of similar or varying durations or amplitudes. In any case the temperature of the thermal body tends to vary as a function of the total or integrated value of the electrical energy applied to the heater H1.

As explained in greater detail hereinafter, heater H2 may be interconnected in a circuit supplying current so that heater H2 will heat regeneratively once its temperature reaches the corresponding transition level, i.e., 80° C. Regenerative heating occurs when the rise in temperature produced by a given amount of heat being generated causes the resistance of the heater H2 to increase to such an extent that the $I^2R$ consumption of power also increases so that even more heat is generated. Regenerative heating is thus a run-away condition in which the temperature of the heater rises abruptly to some limiting value determined by the circuit parameters, resulting in a bistable switching action. Accordingly, as signals of predetermined energy contact are applied to heater H1, the temperature of the thermal body rises gradually as heat accumulates therein. However, when the transition temperature of heater H2 is reached, the regenerative heating thereby initiated causes the temperature of the body to rise abruptly indicating that the accumulated total of the signal energy applied to heater H1 has exceeded a predetermined level. This abrupt rise in temperature can be sensed by means of the corresponding change in the resistance of thermistor TH1.

The integrator of FIG. 1 may advantageously be employed as a counter in an overload protection system such as that illustrated in FIG. 2 to provide a mode of operation in which a load is deenergized in response to an overload condition and is reenergized a predetermined number of times to permit the fault to cure itself, the load then being deenergized without being reenergized if the overload condition persists.

In FIG. 2 there is indicated at 41 an electrical load which is to be protected. Load 41 may, for example, comprise an induction motor which draws a heavy current upon normal starting and which should not be deenergized during such a normal start but which will continue to draw a very heavy current under stalled or locked rotor conditions and should be deenergized if such a situation occurs. The energization of load 41 is controlled by a contactor 43 in conventional manner. The current drawn by the load is measured by a current sensor indicated generally at 45 which operates, as described in greater detail hereinafter, to provide a signal when load 41 draws an overload current for a substantial length of time. The signals provided by current sensor 45 are counted by means of the integrator of FIG. 1 which is indicated generally at 47. A control circuit 49 controls the operation of contactor 43 and responds to the current sensor 45 and integrator 47 to deenergize the load each time sensor 45 generates a signal indicating an overload condition and to reenergize the load a preselected number of times following deenergization of the load. Load 41 may further be provided with a temperature sensor as indicated generally at 51. The temperature sensing means 51 may, for example, comprise a plurality of thermistors embedded in the windings of an induction motor. Control circuit 49 preferably responds also to the temperature sensor 51 to deenergize the load if it should overheat without having drawn such an overload current as would cause sensor 45 to generate an overload signal.

A preferred construction of current sensor 45 is illustrated in FIG. 3. As illustrated in FIG. 3, sensor 45 includes a tubular conductive shell 61 and a thin elongate electrode 63 which is coaxial within the shell. The space between shell 61 and electrode 63 is filled with a semiconductor or thermistor material 65. Material 65 is preferably of the NTC type, that is, the material has a negative temperature coefficient of resistance, and is preferably further of the type in which the resistance changes relatively abruptly at a predetermined transition temperature. In other words, there is a large change in the resistance between electrode 63 and shell 61 when the temperature of the sensor passes through a narrow range of temperatures. A pair of sensing leads 67 and 69 are connected to electrode 63 and shell 65 for obtaining a signal when the temperature of the sensor crosses the aforesaid threshold. Since material 65 is of the NTC type the signal in this example is constituted by a rise in current through the material above a given level. A pair of terminals 71 and 73 are connected to opposite ends of the conductive shell 61 so that the current drawn by load 41 can be conducted longitudinally through the shell 61 thereby to heat the sensor 45 by resistive heating. It should be understood that, while the resistance of shell 61 is sufficient to produce heating under the heavy load currents drawn by a load such as an induction motor, its resistance is not so great that the voltage drop along the length of the sheath interferes with the obtaining of a usable signal between leads 67 and 69.

Referring now to FIG. 4, direct current, at a voltage suitable for transistor circuitry, e.g., 24 volts, is provided between a pair of supply leads L1 and L2. Connected across leads L1 and L2 are a pair of voltage dividers V1 and V2 each of which includes a respective PTC thermistor TH2 and TH3, a respective reference resistor R1 and R2, and a respective gating diode D5 and D6. Each of the dividers V1 and V2 has a junction, J1 and J2 respectively, which is between the respective thermistor and reference resistor. Voltage dividers V1 and V2 provide at these junctions control voltages which vary substantially as functions of the resistance of the respective thermistors. Thermistors TH2 and TH3 constitute the temperature sensor means 51 of FIG. 1. Assuming that the load 11 of FIG. 1 comprises an induction motor M1 in the exemplary circuitry of FIG. 3, thermistors TH2 and TH3 are preferably embedded in the motor windings so as to detect overheating thereof. Power for energizing motor M1, e.g., at 110 volts A.C. is provided between a supply lead L3 and lead L2.

Junctions J1 and J2 are connected, through respective blocking diodes D7 and D8 and a common current limiting resistor R3, to the base terminal of one (Q2) of a pair of NPN transistors Q2 and Q3 which are connected in a Schmitt trigger or level detecting circuit. The collectors of transistors Q2 and Q3 are connected to line L1 through respective load resistors R4 and R5 and their emitters are commonly connected to lead L2 through a resistor R7. The collector of transistor Q2 is also connected to the base terminal of transistor Q3 through a voltage divider comprising a pair of resistors R8 and R9.

As is understood by those skilled in the art, the trigger circuit comprising transistors Q2 and Q3 functions as a switching means and is operative to change from a first state in which Q2 is cut off and Q3 is conducting to a second state in which Q2 is conducting and Q3 is cut off when the voltage applied to the base of transistor Q2 passes a predetermined threshold moving toward more positive voltage levels.

The sensing thermistor TH1 in the accumulator or counter 47 is connected in a voltage divider V3 with a reference resistor R10 to provide at a junction J3 a voltage which varies as a function of the temperature of that thermistor. Junction J3 is connected to the base of PNP transistor Q1. The emitter of transistor Q1 is connected to lead L1 through a resistor R11 and its collector is connected to lead L2 through a resistor R12. The collector of transistor Q1 is also connected, through a gating diode D9 and the resistor R3, to the base of transistor Q2 so that transistor Q1 can cause the Schmitt trigger to switch to its aforesaid second state when voltage divider V3 forward biases transistor Q1.

Heater H1 of the counter 47 is connected in series with the resistance of the temperature sensitive semiconductor material 65 in the current sensor 45, this resistance being designated thermistor TH4 in FIG. 4. Thus heater H1 is energized above a predetermined level when the temperature of the current sensor rises above the threshold of material 65 as described previously.

Heater H2 is connected in series with a resistor R13 and a switch SW1 between leads L2 and L3. The value of resistor R13 is chosen in relation to the A.C. motor supply voltage and the temperature dependent resistance characteristics of heater H2 so that the heater will heat regeneratively once its temperature is raised to a predetermined threshold, i.e., its transition temperature. As is understood by those skilled in the art, such regenerative heating can occur when the equilibrium current-voltage characteristic of a temperature dependent semiconductor element includes a negative resistance region as is the case with elements constructed of materials having resistances which change abruptly at certain temperatures.

The collector of transistor Q3 is connected, through a resistor R14, to the base of a PNP transistor Q4 connected as a common emitter amplifying stage. The emitter of transistor Q4 is connected to line L1 through a gain adjusting rheostat R15 and its collector is connected to the gate of a triac Q5. Triac Q5 is a three-terminal semiconductor current switching device which, as understood by those skilled in the art, is operative to pass alternating current between its first and second anode terminals when triggering current of greater than a predetermined value is applied to its gate. Contactor 43 includes an operating winding K1W which is connected across leads L2 and L3 through a circuit which includes the anode terminals of triac Q5. When triac Q5 is triggered, winding K1W is thus energized directly from the A.C. supply leads L2 and L3. contactor 43 also includes contacts K1A which are connected for energizing motor M1 from leads L2 and L3 through current sensor 45 when winding K1W is energized.

Current taken from between triac Q5 and winding K1W is applied, through respective current limiting resistors R18 and R19 and respective gating diodes D10 and D11, to the thermistors TH2 and TH3.

The operation of the circuit of FIG. 1 with respect to overheating of the motor M1 is as follows: Assuming that motor M1 is relatively cool, the thermistors TH2 and TH3 will also be relatively cool and will exhibit relatively low resistances in relation to the values of resistors R1 and R2. The voltages at junctions J1 and J2 are thus negative with respect to the threshold voltage of the Schmitt trigger circuit and diodes D7 and D8 are reverse biased. Transistor Q2 is thus cut off and transistor Q3 is conducting.

When transistor Q3 is conducting, transistor Q4 is forward biased and applies triggering current, through resistor R14, to the gate terminal of triac Q5. Triac Q5 is thus triggered into conduction and contactor K1 and motor M1 are energized. In this state, that is, when the triac Q5 conducts, virtually no voltage is developed across the two anode terminals and thus no heating current is applied through resistors R18 and R19 to the thermistors TH1 and TH2.

If motor M1 overheats, that is, if it reaches a temperature such that either of the thermistors TH2 or TH3 exhibits a relatively high resistance in relation to the value of the respective reference resistor, a voltage is developed at the respective junction J1 or J2 which is positive with respect to or falls below the trip threshold of the Schmitt trigger circuit. When this happens, the respective diode D7 or D8 is forward biased and transistor Q2 is forward biased into conduction. The Schmitt trigger circuit then reverses states so that the transistor Q2 is conducting and transistor Q3 is cut off.

When transistor Q3 is cut off, bias current is drawn away from the base terminal of transistor Q4 which in turn cuts off the flow of triggering current to the gate terminal of triac Q5, thereby deenergizing contactor K1 and motor M1. In this state, that is, when triac Q5 ceases to conduct, the A.C. supply voltage appears across the anode terminals of the triac instead of winding K1W. During those A.C. half-cycles when the lead L3 is positive with respect to the lead L1, the voltage appearing across the anode terminals of triac Q5 forward biases or switches the diodes D10 and D11 so that current can flow through resistors R18 and R19 from the load circuit to the thermistors TH2 and TH3. This current, coming as it does from a relatively high voltage source, causes an appreciable so-called false heat to be generated internally within the thermistors, tending to drive them beyond the temperature at which they caused the motor M1 to be deenergized. This heating effect is regenerative with respect to heat emanating from the motor and thus prolongs the period over which the motor is deenergized following tripping of the control circuitry. Accordingly, the motor must cool to a substantially cooler temperature than that at which it was deenergized before it is reenergized by this control circuit. Thus, the response of this control circuit is modified by the introduction of a differential between those temperatures of the motor at which it is energized and deenergized. The magnitude of the differential may be adjusted by varying the values of resistors R18 and R19.

The operation of this circuit with respect to overload currents drawn by motor M1 is as follows: If excessive current is drawn by motor M1, the sensor 45 is heated by dissipation from the tubular shell 61. This increase in temperature causes a drop in the resistance of the semiconductor material 65 which reduces the thermistor resistance TH4 causing a sharp increase in the current flowing through heater H1. The heat consequently generated by heater H1 is sensed by thermistor TH1 and the resultant drop in the resistance of thermistor TH1 causes transistor Q1 to be forward biased and to trip the Schmitt trigger comprising transistors Q2 and Q3. Tripping the Schmitt trigger deenergizes contactor K1 and the motor M1 as described previously with reference to the operation of the temperature sensing thermistors TH2 and TH3. As the heating of sensor 45 and heater H1 take a predetermined amount of time which can be preselected by varying the thermal masses of these elements, the apparatus does not trip or cause motor M1 to be deenergized during the time heavier currents are drawn during normal starting.

When motor M1 is thus deenergized, the sensing thermistor TH1 in the integrator 47 cools down sufficiently after a predetermined delay to allow the Schmitt trigger to switch back to its original state and to reapply power to motor M1. If the fault has been cured in the meantime, the motor will remain energized. However, if the overload condition remains, e.g., if the rotor of motor M1 is locked, the heating of the current sensor 45 will again cause the integrator heater H1 to be energized thereby heating thermistor TH1 and again causing deenergization of motor M1. If the fault persists, this cycle may repeat several times, the heater H1 being energized for a substantially predetermined period on each try. As the cycle repeats, heat will gradually distribute through and accumulate in the thermal mass which comprises integrator 47 until, after a predetermined count has been reached, the temperature of heater H2 reaches its threshold of regenerative heating. When H2 heats regeneratively, the thermal mass of integrator 47 rises abruptly and is maintained at a relatively high temperature independently of the current passed by the sensor thermistor resistance TH4 to the heater H1. Accordingly, the thermistor TH1 will be kept at this relatively high temperature and will keep the motor M1 from being reenergized for an indefinite period.

The circuit may be manually reset to allow restarting of motor M1 by opening switch SW1 thereby cutting off the source of power from heater H2 allowing the thermal mass of counter 47 to cool down.

As semiconductor elements are used for sensing and sequencing in place of the electromechanical devices typically used, it can be seen that a relatively inexpensive and yet highly reliable operation is obtained.

In view of the above, it will be seen that the several objects of the invention are achieved and other advantageous results attained.

What is claimed is:

1. Apparatus for indicating when the integrated value of a signal exceeds a predetermined level, said apparatus comprising:
    first and second heaters which are thermally coupled to one another thereby forming a body having a substantially predetermined thermal inertia, said first heater being connected in a circuit for generating an amount of heat which varies as a function of said signal, said second heater comprising a mass of semiconductor material the resistance of which varies substantially with temperature; and
    means for applying current to said second heater to provide regenerative heating of said mass when the temperature of said mass exceeds a predetermined threshold whereby heat generated by said first heater is integrated by the thermal inertia of said body until the temperature of said mass reaches said threshold whereupon regenerative heating of said mass causes the temperature of said body to rise abruptly thereby indicating that the integrated value of said signal has exceeded said predetermined level.

2. Apparatus as set forth in claim 1 wherein said semiconductor material has a positive temperature coefficient of resistivity.

3. Apparatus as set forth in claim 1 wherein said material has a transition temperature above which the resistance of said material changes relatively abruptly.

4. Apparatus as set forth in claim 1 wherein the equilibrium current-voltage characteristic of said second heater include a negative resistance region.

5. Apparatus as set forth in claim 4 wherein said first heater comprises a mass of semiconductor material having a positive temperature coefficient of resistance.

6. Apparatus as set forth in claim 1 including a thermistor responsive to the temperature of said body for providing a signal when said second heater heats regeneratively.

7. Apparatus as set forth in claim 1 including a thermistor which is closely thermally coupled to said first heater for providing a signal when said first heater is energized and when said second heater heats regeneratively.

8. Apparatus as set forth in claim 7 including a layer of insulating material interposed between said first and second heaters for delaying the flow of heat from said first heater to said second heater.

9. Apparatus for protecting an electrical load under overload conditions, said apparatus comprising:
    means for providing a signal when said load draws an overload current;
    first heater means interconnected with said signal means to be energized thereby when said load draws an overload current;
    a thermistor thermally coupled to said first heater means;
    circuit means responsive to the resistance of said thermistor for deenergizing said load when the temperature of said thermistor exceeds a preselected level whereby an overload current causes said first heater to heat said thermistor above said level deenergizing said load, said load being reenergized when said thermistor cools down below said level following deenergization of said load;
    second heater means thermally coupled to said first heater means to form therewith a body having a substantially predetermined thermal inertia, said second heater means comprising a mass of semiconductor material the resistance of which varies with temperature; and
    means for applying current to said second heater thereby to provide regenerative heating of said mass when the temperature of said mass exceeds a predetermined threshold whereby heat generated by said first heater upon each occurrence of an overload is integrated by the thermal inertia of said body and then when the temperature of said mass reaches said threshold after a predetermined number of successive overloads regenerative heating of said mass causes the temperature of said body to rise abruptly thereby heating said first heater and said thermistor above said level to maintain deenergization of said load.

10. Apparatus for protecting an electrical load under overload conditions, said apparatus comprising:
    a sensor for sensing the current drawn by said load, said sensor including a sensor heater for generating an amount of heat which varies as a function of said load current and sensor thermistor means responsive to the heat generated by said heater for providing a signal when said load draws an overload current;
    first heater means interconnected with said sensor thermistor means to be energized thereby when said load draws an overload current;
    a thermistor thermally coupled to said first heater means; and
    circuit means responsive to the resistance of said thermistor for deenergizing said load when the temperature of said thermistor exceeds a preselected level whereby an overload current causes said first heater to heat said thermistor above said level thereby to deenergize said load, said load being reenergized when said sensor cools down below said level following deenergization of said load;
    second heater means thermally coupled to said first heater means to form therewith a body having a substantially predetermined thermal inertia, said second heater means comprising a mass of semiconductor material the resistance of which varies relatively abruptly above a predetermined temperature threshold; and means for applying current to said second heater thereby to provide regenerative heating of said mass when the temperature of said mass exceeds said predetermined threshold whereby heat generated by said first heater upon each occurrence of an overload is integrated by the thermal inertia of said body and then when the temperature of said mass reaches said threshold after a predetermined number of successive overloads regenerative heating of said mass causes the temperature of said body to rise abruptly thereby heating said first heater and said thermistor above said level to maintain deenergization of said load.

References Cited

UNITED STATES PATENTS

| | | | |
|---|---|---|---|
| 2,903,664 | 9/1959 | Wells | 338—23 |
| 3,307,167 | 2/1967 | Race | 338—23 |

RODNEY D. BENNETT, Jr., Primary Examiner

H. C. WAMSLEY, Assistant Examiner

U.S. Cl. X.R.

317—41; 338—23